Figure 1:
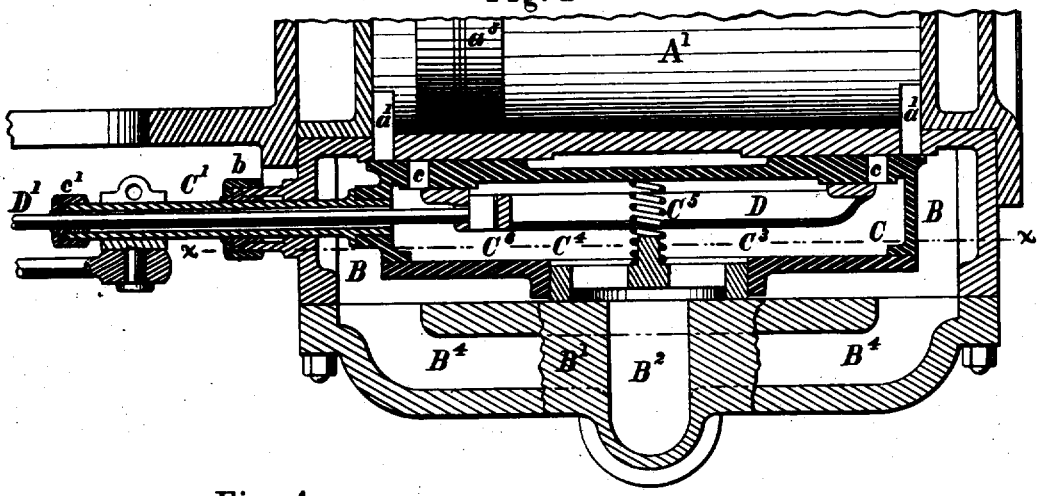

J. W. THOMPSON.

Assignor to himself and BUCKEYE ENGINE CO.

Balanced and Cut-Off Valve.

No. 8,434. Reissued Sept. 24, 1878.

Witnesses.
Geo. A. Vaillant.
Wm. E. Morgan.

Inventor.
Jos. W. Thompson
by J. Thornden Bell
atty.

N. PETERS, PHOTO-LITHOGRAPHER, WASHINGTON, D. C.

UNITED STATES PATENT OFFICE.

JOSEPH W. THOMPSON, OF SALEM, OHIO, ASSIGNOR TO HIMSELF AND BUCKEYE ENGINE COMPANY.

IMPROVEMENT IN BALANCED AND CUT-OFF VALVES.

Specification forming part of Letters Patent No. 162,714, dated April 27, 1875; Reissue No. 8,434, dated September 24, 1878; application filed September 14, 1878.

DIVISION C.

*To all whom it may concern:*

Be it known that I, JOSEPH W. THOMPSON, of Salem, in the county of Columbiana and State of Ohio, have invented certain new and useful Improvements in Steam-Engine Valves, of which the following is a specification:

The object of the first part of my invention is to provide a slide distribution-valve which shall be, as nearly as practicable, balanced, and in the application of which the length of the steam-supply passages shall be greatly reduced and the usual long and tortuous exhaust-passages wholly avoided.

To this end the improvement consists in a main slide-valve composed of a case or chamber working over a valve-face, separated at center from the bore of the cylinder by a thickness of metal which is not substantially greater than that of the body of the cylinder, said main valve having upon one of its sides two induction-ports, which alternately communicate with two corresponding ports formed in the shell or body of the cylinder, and having, in a plate or cover upon its opposite side, one or more openings, communicating, through packing-rings, with a steam-pipe opening in the cover of the chest in which the valve moves, so that steam shall be admitted into and through the main valve to the cylinder, and exhausted therefrom through the cylinder-ports and upon and around the outside of said valve.

The object of the next part of my invention is to provide an automatic cut-off valve, in the operation of which the steam may be cut off at different points in the stroke of the piston, as required, by the action of a governor, and as closely as practicable to the cylinder-ports, to the end of preventing waste of steam therein and correspondingly approximating perfect automatic regulation, the function and operation of the cut-off valve being independent of those of the main distribution-valve, and its action being effected in proper relation to that of said main valve.

The improvement consists in the combination of a balanced box or chambered main valve having two induction-ports for the admission of steam to the cylinder through its inside, and effecting exhaust release by uncovering corresponding cylinder-ports, and a separate cut-off valve, which is seated upon the inside of said main valve, and works over the induction-ports thereof, being operated by means of a stem passing through a tubular rod which works the main valve, all as hereinafter more fully set forth.

Figure 4:
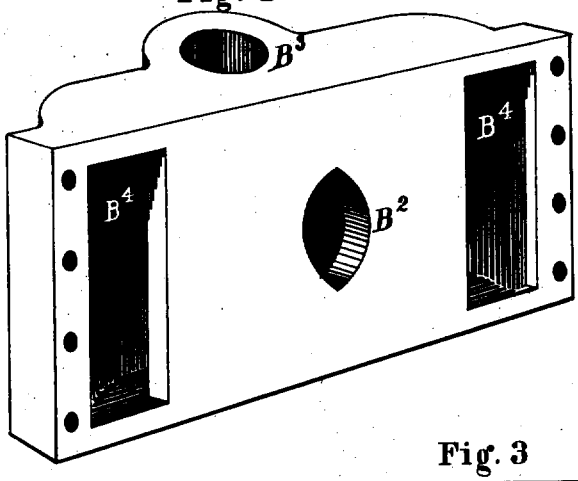
Figure 2:
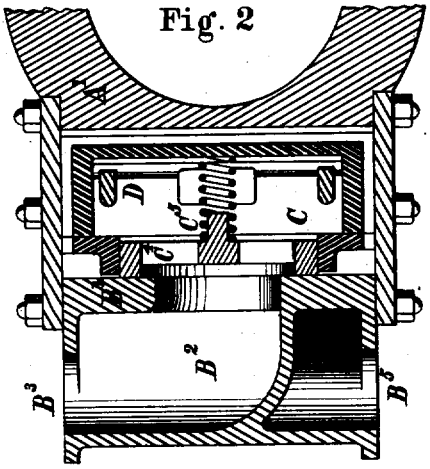
Figure 3:
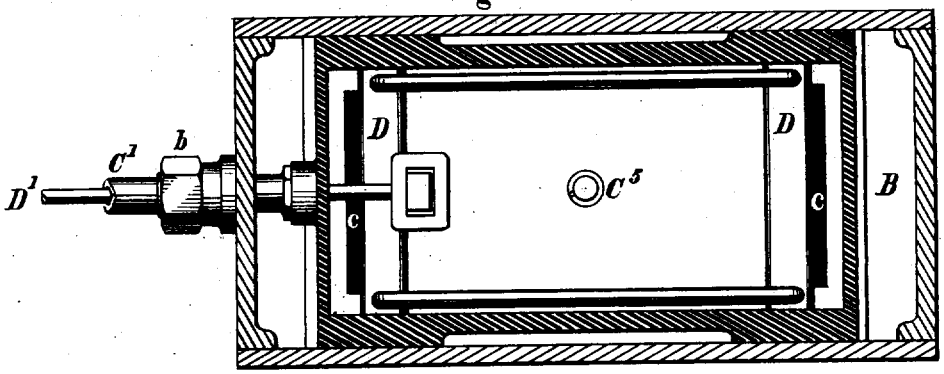

In the accompanying drawings, Figure 1 is a horizontal central section through a steam-engine cylinder and valves embodying my improvements; Fig. 2, a vertical transverse central section through the same; Fig. 3, a vertical longitudinal section through the exhaust-chest at the line $x\,x$ of Fig. 1; and Fig. 4, a view, in perspective, of the cover of the exhaust-chest detached.

The cylinder A′ of the engine is provided with a rectangular chest, B, substantially similar to the steam-chest ordinarily employed, and which I shall term the "exhaust-chest," as, excepting in the interior of the main valve C, to be presently described, it contains, during the operation of the engine, only exhaust-steam.

A port, $a^1$, is formed in the cylinder adjacent to each of its ends, said ports establishing communication between the interior of the cylinder and the exhaust-chest B.

A main or distribution valve, C, is fitted to slide upon a valve-face formed on the shell or body of the cylinder, over the ports $a$, the thickness of which valve-face at center need be no greater than is required to provide the requisite strength of material, as the ordinary exhaust-passages are dispensed with.

The main valve C is a rectangular case or chest, having two induction-ports, $c$, formed in one of its sides, corresponding in area with the ports $a^1$ in the valve-face, against which this side of the valve bears at and near each of its ends.

A steam-supply opening, $C^3$, (one or more,) is formed in a plate or cover, $C^6$, secured upon the opposite side of the valve, which cover works entirely clear of the cover of the chest B.

A balance packing-ring, $C^4$, fitting steam-tight against the cover $B^1$ of the chest, is inserted within the opening $C^3$ in the valve-cover, and constitutes the only bearing of the valve against the chest-cover, thus enabling, by the employment of an opening or openings of proper dimensions, a preponderance of pressure to be brought upon the lower side of the valve, just sufficient to hold it to its seat, and serving to balance it as nearly as is practicable or desirable. There may be two or more of these openings $C^3$ in the side of the valve C, if desired.

A spring, $C^5$, bears against the ring $C^4$, and serves to maintain it in position against the cover of the exhaust-chest when the steam is shut off from the valve.

Steam is admitted to the supply opening or openings $C^3$ through a passage, $B^2$, in the cover $B^1$, communicating with the steam-pipe $B^3$, and passes through the valve C and the ports *c* and $a^1$ to the cylinder. When exhausted therefrom it passes into the exhaust-chest B, around the outside of and above and below the main valve C, and escapes through a passage, $B^4$ in the cover $B^1$, to the exhaust-pipe $B^5$. A tubular valve-stem, $C^1$, secured to the valve C, and passing through a stuffing-box, *b*, in the chest B, is suitably connected to an eccentric, by which the required reciprocating motion is imparted to the valve.

The essential advantage of this arrangement is that the space ordinarily required in the shell of the cylinder between the bore and the valve-face for the exhaust-passages is avoided, and the main-valve face is brought as near to the bore as is consistent with the necessary strength of material; also, the exhaust having a more direct passage to the pipe after leaving the cylinder, there is less back-pressure than with the ordinary arrangement.

Another advantage is, that the lap on the live-steam side is on the inside of the port—that is, toward the center—where there is ample room for making it as long as may be desired without having to increase the length of the valve and the chest, as in the ordinary case, in which the lap is on the outside of the valve, where, in this instance, the lap for the exhaust is provided, which exhaust-lap only needs to be short under any circumstances.

The cut-off valve D consists of two bars or plates, united by longitudinal connecting-pieces, and working on seats formed on the inside of the main valve C at the inner extremities of its ports *c*, and by intercepting the flow of steam through the same at proper intervals performs its function of cutting off at different required portions of the stroke of the piston $a^5$, in consonance with variations in the position of its operating-eccentric angularly upon its shaft. The stem $D^1$ of the cut-off valve passes through the tubular stem of the main valve, which is provided at its outer end with a stuffing-box, *c'*.

The intermediate mechanism by which the main and cut-off valve stems are connected with their respective eccentrics need not be here shown or described, as the same, *per se*, forms no part of my present invention, which particularly relates to the specific construction of the valves and their relation to each other and the exhaust-chest and cylinder. Said intermediate mechanism is, moreover, fully set forth in a separate application, filed simultaneously herewith, and marked "Division A."

My improved construction and combination of the main and cut-off valve are specially advantageous in use on an automatic cut-off engine, as the closeness of the cut-off valve to the cylinder enables regulation to be effected in close conformity with variations of pressure and resistance by reducing, as far as practicable, the quantity of steam between the valve and cylinder, when closure takes place by the movement of the cut-off valve under the action of the governor.

I am aware that a box-valve having an internal steam or exhaust passage, and wholly or partially balanced by the employment of a packing-ring, has heretofore been known, and do not, therefore, broadly claim such device.

I claim as my invention and desire to secure by Letters Patent—

1. The combination, with a steam-cylinder and an inclosing-chest connected thereto, of a main valve consisting of a case or chest working on a face on the cylinder, and having in its side adjacent thereto two induction-ports, to respectively communicate with corresponding ports therein, and upon a cover secured on its opposite side a supply opening or openings communicating through a packing ring or rings, which constitute the bearing of the valve on the cover of the inclosing-chest, with a steam-induction passage therein, substantially as set forth.

2. The combination of a box or chambered main distribution valve, balanced in the manner described, said valve having two induction-ports for the admission of steam to the cylinder through the inside of the valve, and effecting exhaust release by uncovering corresponding cylinder-ports, and a separate cut-off valve, seated upon the inside of said main valve, and working over the induction-ports thereof, substantially as set forth.

3. The combination of a box or chambered main valve, balanced as described, a tubular stem secured to said main valve, and a separate cut-off valve, seated within the main valve, and operated by a stem passing through the tubular stem of said main valve, all constructed and arranged substantially as set forth.

4. The combination of a box or chambered main valve, an inclosing-chest, and a chest-cover having an induction-passage communicating with the interior of the main valve and an exhaust-passage communicating with the interior of the chest, substantially as set forth.

JOSEPH W. THOMPSON.

Witnesses:
THOMAS KENNETT,
PETER AMBLER.